US012673675B2

(12) United States Patent
Kim

(10) Patent No.: US 12,673,675 B2
(45) Date of Patent: Jul. 7, 2026

(54) DEVICE AND METHOD FOR CONTROLLING VEHICLE

(71) Applicants: Hyundai Motor Company, Seoul (KR); Kia Corporation, Seoul (KR)

(72) Inventor: Il Hwan Kim, Hwaseong-Si (KR)

(73) Assignees: Hyundai Motor Company, Seoul (KR); Kia Corporation, Seoul (KR)

( * ) Notice: Subject to any disclaimer, the term of this patent is extended or adjusted under 35 U.S.C. 154(b) by 248 days.

(21) Appl. No.: 18/381,139

(22) Filed: Oct. 17, 2023

(65) Prior Publication Data
US 2024/0199014 A1    Jun. 20, 2024

(30) Foreign Application Priority Data

Dec. 14, 2022    (KR) ........................ 10-2022-0175198

(51) Int. Cl.
| | |
|---|---|
| *B60W 30/14* | (2006.01) |
| *B60W 30/095* | (2012.01) |
| *B60W 30/165* | (2020.01) |
| *B60W 40/105* | (2012.01) |
| *B60W 50/14* | (2020.01) |

(52) U.S. Cl.
CPC ...... *B60W 30/143* (2013.01); *B60W 30/0956* (2013.01); *B60W 30/165* (2013.01); *B60W 40/105* (2013.01); *B60W 50/14* (2013.01); *B60W 2050/143* (2013.01); *B60W 2540/106* (2013.01); *B60W 2540/12* (2013.01); *B60W 2554/4041* (2020.02); *B60W 2554/802* (2020.02)

(58) Field of Classification Search
CPC ........... B60W 30/143; B60W 30/0956; B60W 50/14; B60W 2540/12; B60W 30/09; B60W 30/16; B60W 30/08; B60W 60/0053; B60W 2540/10
See application file for complete search history.

(56) References Cited

U.S. PATENT DOCUMENTS

| | | | | |
|---|---|---|---|---|
| 2012/0265418 A1* | 10/2012 | Foerster | ................ | B60W 10/06 |
| | | | | 701/70 |
| 2017/0349186 A1* | 12/2017 | Miller | ................... | B60W 50/14 |
| 2018/0050673 A1* | 2/2018 | D'sa | ......................... | B60T 8/58 |
| 2019/0317494 A1* | 10/2019 | Lee | ....................... | B60W 50/10 |
| 2022/0332319 A1* | 10/2022 | Park | ....................... | H04W 4/029 |

* cited by examiner

*Primary Examiner* — Joan T Goodbody
*Assistant Examiner* — Rafael Velasquez Vanegas
(74) *Attorney, Agent, or Firm* — Banner & Witcoff, Ltd.

(57)    ABSTRACT

A device for controlling a first vehicle includes a sensor device, a processor, and a travel control device. The sensor device generates a speed control command associated with a first rate of speed change of the first vehicle. The processor is configured to detect a target vehicle, wherein a distance between the first vehicle and the target vehicle is reduced based on the speed control command being executed; and generate a control signal for changing, at a second rate of speed change of the first vehicle, a speed of the first vehicle to a target speed during a speed changing period. The travel control device changes the speed of the first vehicle based on a control signal. A difference between the target speed and a speed of the target vehicle is less than or equal to a preset speed difference threshold.

17 Claims, 17 Drawing Sheets

AMOUNT OF BRAKING (0)

time t1    t2    t3

DEVICE AND METHOD FOR CONTROLLING VEHICLE

CROSS-REFERENCE TO RELATED APPLICATION

This application claims the benefit of priority to Korean Patent Application No. 10-2022-0175198, filed in the Korean Intellectual Property Office on Dec. 14, 2022, the entire contents of which are incorporated herein by reference.

TECHNICAL FIELD

The present disclosure relates to a device and a method for controlling a vehicle, and more particularly, to a technology for controlling an autonomous vehicle.

BACKGROUND

An autonomous vehicle includes a vehicle that recognizes a travel environment without direct manipulation by a driver to determine a dangerous event, plans a travel route to minimize and/or reduce driving manipulation of the driver, and drives safely by itself.

In the autonomous vehicle, vehicle driving control such as steering, acceleration, and braking may be performed in a manual driving mode or an autonomous driving mode. For example, if the driver steps on a brake pedal or an accelerator pedal while the vehicle is traveling based on an automated lane keeping system (ALKS), the autonomous vehicle may transfer (e.g., return) a control right of the vehicle to the driver. For example, if there is a request for deceleration or the acceleration from the driver while performing autonomous driving based on the ALKS, the vehicle may decelerate or accelerate under control of the driver.

As such, if the deceleration or acceleration request from the driver is immediately accepted in the process of the driving with the autonomous driving, a risk of collision with adjacent vehicles may occur. In particular, in the process of the autonomous driving, the driver may be careless about the driving, and there may be a possibility that the brake pedal and the accelerator pedal may be operated by a driver's mistake regardless of a driver's intention.

Descriptions in this background section are provided to enhance understanding of the background of the disclosure, and may include descriptions other than those of the prior art already known to those of ordinary skill in the art to which this technology belongs.

SUMMARY

The following summary presents a simplified summary of certain features. The summary is not an extensive overview and is not intended to identify key or critical elements.

An aspect of the present disclosure provides a device and a method for controlling a vehicle capable of more efficiently adjusting a control right of the vehicle that performs autonomous driving.

If there is a control of the driver in the vehicle under the autonomous driving, one or more operations may be performed before returning the control right of the vehicle to the driver.

Another aspect of the present disclosure provides a device and a method for controlling a vehicle capable of eliminating a possibility of a collision that may occur in a process of transferring a control right of the vehicle under autonomous driving.

The technical problems to be solved by the present disclosure are not limited to the aforementioned problems, and any other technical problems not mentioned herein will be understood from the following description by those skilled in the art to which the present disclosure pertains.

A device for controlling a first vehicle may comprise: a sensor device configured to generate a speed control command associated with a first rate of speed change of the first vehicle; a processor configured to: detect a target vehicle, wherein a distance between the first vehicle and the target vehicle is reduced based on the speed control command being executed; and generate a control signal for changing, at a second rate of speed change of the first vehicle, a speed of the first vehicle to a target speed during a speed changing period, wherein the control signal is generated based on a determination that the first vehicle is traveling at the speed that increases the distance between the first vehicle and the target vehicle, and wherein a difference between the target speed and a speed of the target vehicle is less than or equal to a preset speed difference threshold; and a travel control device configured to change, based on the control signal, the speed of the first vehicle.

The processor may be configured to change, based on a determination that the first vehicle is faster than the target vehicle, the speed of the first vehicle to the target speed by reducing the speed of the first vehicle such that the difference becomes less than or equal to the speed difference threshold, wherein the processor is configured to determine that the first rate of speed change of the first vehicle is a deceleration rate that causes a collision of the first vehicle and the target vehicle. The target vehicle may be a following vehicle that follows the first vehicle. The second rate of speed change of the first vehicle may be lower than the first rate of speed change of the first vehicle.

The processor may be configured to: after the speed changing period, decelerate the first vehicle based on: a brake-pedal position sensor signal; and a leading vehicle, in a position ahead of the first vehicle, associated with a risk of collision with the first vehicle being detected based on a time to collision.

The processor may be configured to change, based on a determination that the first vehicle is slower than the target vehicle, the speed of the first vehicle to the target speed by increasing the speed of the first vehicle such that the difference becomes less than or equal to the speed difference threshold, wherein the processor is configured to determine that the first rate of speed change of the first vehicle is an acceleration rate that causes a collision of the first vehicle and the target vehicle. The target vehicle may be a leading vehicle in front of the first vehicle. The second rate of speed change of the first vehicle may be lower than the first rate of speed change of the first vehicle.

The processor may be configured to after the speed changing period, accelerate the first vehicle based on: an accelerator position sensor signal; and a following vehicle, which follows the first vehicle, associated with a risk of collision with the first vehicle being detected based on a time to collision.

The device may further comprise an alarm device configured to output an alarm to inform a driver of the first vehicle that the speed control command is limited. The processor may be configured to transfer a control right of the first vehicle to the driver based on a second speed control command being detected after outputting the alarm.

A method for controlling a first vehicle may comprises: detecting, by a device, a speed control command associated with a first rate of speed change of the first vehicle; detecting a target vehicle, wherein a distance between the first vehicle and the target vehicle is reduced based on the speed control command being executed; changing, at a second rate of speed change of the first vehicle, a speed of the first vehicle to a target speed during a speed changing period, wherein the changing the speed of the first vehicle to the target speed is based on a determination that the first vehicle is traveling at the speed that increases the distance between the first vehicle and the target vehicle, and wherein a difference between the target speed and a speed of the target vehicle is less than or equal to a preset speed difference threshold; and after the speed changing period, maintaining the target speed by overriding the speed control command.

The detecting of the speed control command may comprise: identifying that a change amount of a brake-pedal position sensor signal of the first vehicle within a unit time is greater than or equal to a first threshold value.

The changing of the speed of the first vehicle may comprise: reducing the speed of the first vehicle by decelerating the first vehicle, wherein the target vehicle is a following vehicle that follows the first vehicle. The second rate of speed change of the first vehicle may be lower than the first rate of speed change of the first vehicle.

The detecting of the target vehicle may further comprise: detecting, based on a time to collision, a leading vehicle, in a position ahead of the first vehicle, associated with a risk of collision with the first vehicle. The method may further comprise, after the speed changing period, decelerating the first vehicle based on: the brake-pedal position sensor signal; and the detected leading vehicle.

The detecting of the speed control command may comprise: identifying that a change amount of an accelerator position sensor signal of the first vehicle within a unit time is greater than or equal to a second threshold value.

The changing of the speed of the first vehicle may comprise: increasing the speed of the first vehicle by accelerating the first vehicle, wherein the target vehicle is a leading vehicle in a position ahead of the first vehicle. The second rate of speed change of the first vehicle may be lower than the first rate of speed change of the first vehicle.

The detecting of the target vehicle may further comprise: detecting, based on a time to collision, a following vehicle, which follows the first vehicle, associated with a risk of collision with the first vehicle. The method may further comprise, after the speed changing period, accelerating the first vehicle based on: the accelerator position sensor signal; and the detected following vehicle.

The changing of the speed of the first vehicle may be performed based on a determination that a time gap between the first vehicle and the target vehicle is greater than or equal to a preset threshold time.

The method may further comprise: outputting an alarm to inform a driver of the first vehicle that the speed control command is limited; and transferring a control right of the first vehicle to the driver based on a second speed control command being detected after outputting the alarm.

These and other features and advantages are described in greater detail below.

BRIEF DESCRIPTION OF THE DRAWINGS

The above and other objects, features and advantages of the present disclosure will be more apparent from the following detailed description taken in conjunction with the accompanying drawings.

DETAILED DESCRIPTION

Figure 1:
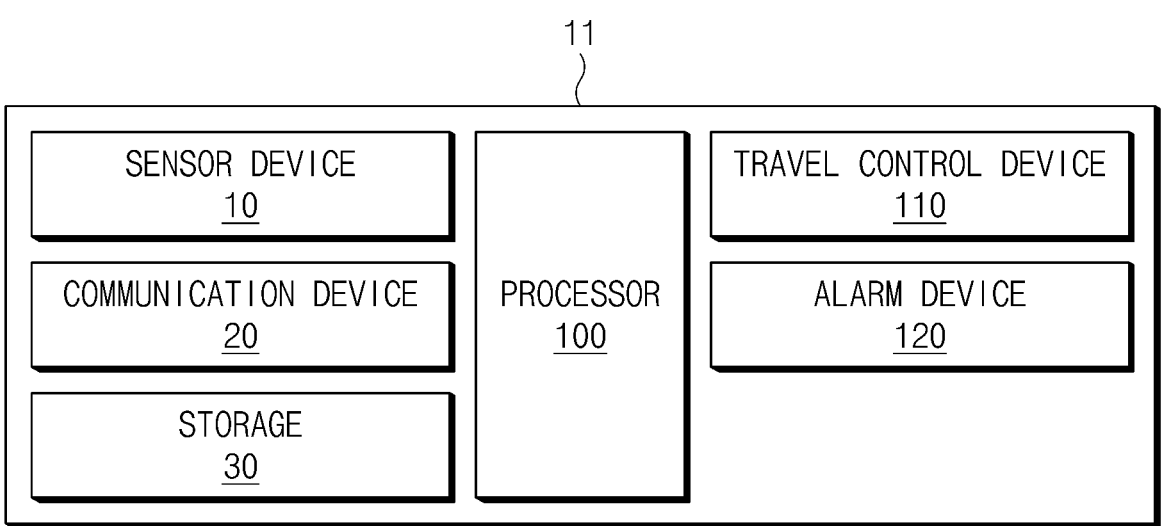
FIG. 1 is a block diagram illustrating a configuration of a vehicle control device.

Hereinafter, various examples of the present disclosure will be described in detail with reference to the exemplary drawings. In adding the reference numerals to the components of each drawing, it should be noted that the identical or equivalent component is designated by the identical numeral even when they are displayed on other drawings. Further, in describing the present disclosure, a detailed description of the related known configuration or function may be omitted when it is determined that it interferes with the understanding of the gist of the present disclosure.

In describing the components described in the present disclosure, terms such as first, second, A, B, (a), (b), and the like may be used. These terms are merely intended to distinguish the components from other components, and the terms do not limit the nature, order or sequence of the components. Unless otherwise defined, all terms including technical and scientific terms used herein have the same meaning as commonly understood by one of ordinary skill in the art to which this disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, various examples of the present disclosure will be described in detail with reference to FIGS. 1 to 17.

FIG. 1 is a block diagram illustrating a configuration of a vehicle control device. A vehicle control device 11 may be implemented for a vehicle (e.g., inside a vehicle). In this regard, the vehicle control device 11 may be integrally formed with internal control units (e.g., controllers, processors, etc.) of the vehicle, and/or may be implemented as a separate device and connected to the control units of the vehicle by separate connection interfaces.

Referring to FIG. 1, the vehicle control device may include a sensor device 10, a communication device 20, storage 30, a processor 100, a travel control device 110, and an alarm device 120.

The sensor device 10 may include a brake-pedal position sensor (BPS) and an accelerator position sensor (APS). The BPS and/or the APS may generate a speed control command for changing a speed of the vehicle.

The brake-pedal position sensor may output a BPS signal based on a degree of depression of a brake pedal equipped in the vehicle. For example, the BPS signal may output data indicating a value in a range (e.g., from 0 to 100) based on the depression of the brake pedal, a first value (e.g., a minimum value, a value of 0) may be output when the brake pedal is not pressed, and a second value (e.g., a maximum value, a value of 100) may be output when the brake pedal is maximally pressed.

The accelerator position sensor may output an APS signal based on a degree of depression of an accelerator pedal equipped in the vehicle. As an example, the APS signal may output data indicating a value in a range (e.g., from 0 to 100) based on the depression of the accelerator pedal, a first value (e.g., a minimum value, a value of 0) may be output when the accelerator pedal is not pressed, and a second value (e.g., a maximum value, a value of 100) may be output when the accelerator pedal is maximally pressed.

The sensor device 10 may include at least one of a camera, a radio detection and ranging (RADAR), a light imaging detection and ranging (LIDAR), an ultrasonic sensor, and/or an infrared sensor for detecting objects outside the vehicle (e.g., especially vehicles located in front of or at the rear of the vehicle).

The camera may be located at an appropriate place on an outer side of the vehicle, for example, at a front portion, at a rear portion, on a right side mirror, and/or on a left side mirror of the vehicle to obtain an image of an external area of the vehicle. The camera may be a mono camera, a stereo camera, an around view monitoring (AVM) camera, and/or a 360-degree camera.

The camera may be placed inside the vehicle, proximate to a front windshield, around a front bumper, and/or a radiator grill, to obtain an image of an area in front of the vehicle.

The camera may be placed inside the vehicle, proximate to at least one of side windows, to obtain an image of an area on a side of the vehicle. The camera may be placed around a fender and/or a door.

The radar may include electromagnetic wave transmission and reception modules. The radar may be implemented in a pulse radar scheme and/or a continuous wave radar scheme in terms of a radio wave emission principle. The radar may be implemented in a frequency modulated continuous wave (FMCW) scheme and/or a frequency shift keying (FSK) scheme of the continuous wave radar scheme based on a signal waveform. The radar may detect the object based on a time of flight (TOF) scheme and/or a phase-shift scheme using an electromagnetic wave as a medium, and detect a position of the detected object, a distance to the detected object, and a relative speed with respect to the detected object.

The LIDAR may include laser transmission and reception modules. The LIDAR may be implemented in the time of flight (TOF) scheme or the phase-shift scheme. The LIDAR may be exposed to the outside of the vehicle to detect the object located in front of, at the rear of, and/or on the side of the vehicle.

The ultrasonic sensor may include ultrasonic transmission and reception modules. The ultrasonic sensor may detect the object based on an ultrasonic wave, and detect the position of the detected object, the distance to the detected object, and/or the relative speed with respect to the detected object. The ultrasonic sensor may be placed at the appropriate place on the outer side of the vehicle to detect the object located in front of, at the rear of, and/or on the side of the vehicle.

The infrared sensor may include infrared transmission and reception modules. The infrared sensor may detect the object based on infrared light and detect the position of the detected object, the distance to the detected object, and the relative speed with respect to the detected object. The infrared sensor may be placed on the outer side of the vehicle to detect the object located in front of, at the rear of, or on the side of the vehicle.

The communication device 20 may perform communication with a user terminal, another vehicle, and/or an external server.

The communication device 20 may perform short range communication, GPS signal reception, vehicle-to-everything (V2X) communication, optical communication, broadcast transmission and reception, and intelligent transport system (ITS) communication functions.

The communication device 20 may support the short range communication using at least one of Bluetooth, radio frequency identification (RFID), infrared data association (IrDA), ultra wideband (UWB), ZigBee, near field communication (NFC), wireless-fidelity (Wi-Fi), Wi-Fi Direct, and/or wireless universal serial bus (Wireless USB) technologies.

The communication device 20 may include a global positioning system (GPS) module and/or a differential global positioning system (DGPS) module for obtaining position information.

The communication device 20 may include a V2X communication module. The V2X communication module may include an RF circuit implementing a protocol of wireless communication with a server (vehicle to infra; V2I), another vehicle (vehicle to vehicle; V2V), or a pedestrian (vehicle to pedestrian; V2P).

The communication device 20 may transmit/receive a wireless signal to/from at least one of a base station, an external terminal, and/or a center on a mobile communication network built based on technical standards or communication schemes for mobile communication. For example, the communication device 20 may perform the communication based on a global system for mobile communication (GSM), code division multi access (CDMA), code division multi access 2000 (CDMA2000), enhanced voice-data optimized or enhanced voice-data only (EV-DO), wideband CDMA (WCDMA), high speed downlink packet access (HSDPA), high speed uplink packet access (HSUPA), long term evolution (LTE), long term evolution-advanced (LTE-A), New Radio (NR), 6G, etc. The wireless signal may include a voice call signal, a video call signal, and/or various types of data based on text/multimedia message transmission/reception.

The storage 30 may store algorithms and an artificial intelligence (AI) processing modules for operation of the processor 100. As the storage 30, a hard disk drive, a flash memory, an electrically erasable programmable read-only memory (EEPROM), a static RAM (SRAM), a ferro-electric RAM (FRAM), a phase-change RAM (PRAM), a magnetic RAM (MRAM), a dynamic random access memory (DRAM), a synchronous dynamic random access memory (SDRAM), a double date rate-SDRAM (DDR-SDRAM), and the like may be used.

The processor 100 may detect the speed control command. The speed control command may be a user input for changing the speed of the vehicle, and may be identified based on the BPS signal and the APS signal. For example, the processor 100 may detect that a speed control command for deceleration is input if a change amount of the BPS signal within a unit time is equal to or greater than a first threshold value. The first threshold value may be set to a level of the BPS signal requesting an amount of braking capable of suddenly braking the vehicle. The processor 100 may detect that a speed control command for acceleration is input if a change amount of the APS signal within a unit time is equal to or greater than a second threshold value. The second threshold value may be set to a level of the APS signal requesting an amount of acceleration capable of rapidly accelerating the vehicle.

The processor 100 may detect a target vehicle of which distance to the vehicle is shortened by the speed control command. For example, if the vehicle decelerates by the BPS signal, a distance between the decelerated vehicle and a following vehicle decreases, so that the following vehicle may be detected as the target vehicle. If the vehicle accelerates by the APS signal, a distance between the accelerated vehicle and a leading vehicle decreases, so that the leading vehicle may be detected as the target vehicle.

If the vehicle is traveling at a speed that increases the distance to the target vehicle, during a speed changing period, the processor 100 may change the speed of the vehicle such that the vehicle reaches a target speed. The target speed may correspond to a speed of the target vehicle, and may be set, for example, to the speed of the target vehicle and to be within a range such that a relative speed with respect to the target vehicle is equal to or lower than a preset threshold speed. The processor 100 may control speed of the vehicle to the target speed, so that the relative speed of the vehicle with respect to the target vehicle may be equal to or lower than the threshold speed. The threshold speed may be determined at a level at which the vehicle and the target vehicle may maintain a substantially similar speed, and may be, for example, determined to a value close to 0.

After the speed changing period, the processor 100 may limit the speed control command to maintain the target speed. For example, the speed control command after the vehicle reaches the target speed may be ignored.

The processor 100 may determine whether a time gap between the vehicle and the target vehicle is equal to or greater than a preset threshold time to perform an operation in the speed changing period. If the time gap between the vehicle and the target vehicle is smaller than the threshold time (e.g., when the time gap between the vehicle and the target vehicle is very small and thus there is a concern about a collision with the target vehicle caused by the speed change), the processor 100 may not perform the operation in the speed changing period.

The processor 100 may detect a dangerous vehicle with a risk of collision. The risk of collision may be determined based on a time to collision (TTC). The TTC may be a time obtained by dividing a distance between the dangerous vehicle and the vehicle by a relative speed at a specific time point.

Alternatively or additionally, the time gap may be used to determine the risk of collision. For example, the processor 100 may determine that there is a risk of collision with the dangerous vehicle if the time gap is equal to or lower than a certain level or the time to collision is equal to or lower than a certain level.

When detecting the following vehicle as the target vehicle based on the BPS signal, the processor 100 may detect a dangerous leading vehicle having the risk of collision among leading vehicles. Alternatively or additionally, when detecting the leading vehicle as the target vehicle based on the APS signal, the processor 100 may detect a dangerous following vehicle having the risk of collision among following vehicles.

When detecting the dangerous vehicle, the processor 100 may decelerate or accelerate the vehicle in response to the speed control command without limiting the speed control command.

After the maintaining of the target speed, the processor 100 may transmit an alarm via the alarm device 120 to inform a driver that the speed control command is limited. If the speed control command is detected again within a certain time after the transmission of the alarm, the processor 100 may transfer a control right of the vehicle to the driver.

The processor 100 may perform artificial intelligence learning on data provided from the sensor device 10 to detect the target vehicle and the dangerous vehicle. To this end, the processor 100 may include an artificial intelligence (AI) processor. The AI processor may perform a learning process associated with a neural network using a pre-stored program. The neural network for detecting the target vehicle and the dangerous vehicle may be designed to simulate a human brain structure on a computer, and may include a plurality of network nodes having weights that simulate neurons of a human neural network. The plurality of network nodes may transmit and receive the data based on connection relationships thereof so as to simulate synaptic activities of the neurons that transmit and receive signals via synapses. The neural network may include a deep learning model developed from a neural network model. In the deep learning model, the plurality of network nodes may transmit and receive the data based on convolution connection relationships thereof while being located in different layers. Examples of the neural network model may include various deep learning techniques such as a deep neural network (DNN), a convolutional deep neural network (CNN), a recurrent Boltzmann machine (RNN), a restricted Boltzmann machine (RBMs), a deep belief neural network (DBN), a deep Q-network, and the like.

The travel control device 110 may vary the speed of the vehicle in response to a control signal from the processor 100.

The travel control device 110 may include an engine control module, a braking control module, and a transmission control module.

The engine control module may include an actuator that controls an engine of the vehicle and controls the acceleration of the vehicle. The engine control module may be implemented as an engine management system (EMS). The engine control module controls a driving torque of the engine based on accelerator pedal position information output from the accelerator position sensor. The engine control module may control output of the engine to follow a travel speed of the vehicle requested from the processor 100 during autonomous driving.

The braking control module may include an actuator that controls the deceleration of the vehicle and may be able to be implemented as an electronic stability control (ESC). The braking control module may control a braking pressure to follow the target speed requested from the processor 100. For example, the braking control module may control the deceleration of the vehicle.

The transmission control module may include an actuator for controlling a transmission of the vehicle and may be able to be implemented as a shift by wire (SBW). The transmission control module may control the speed change of the vehicle based on a gear position and a gear state range.

The alarm device 120 may provide an indication, to the driver, a driving state of the vehicle. At least one of a display, a speaker, or haptic devices coupled to the steering wheel may be used as the alarm device 120.

Figure 2:
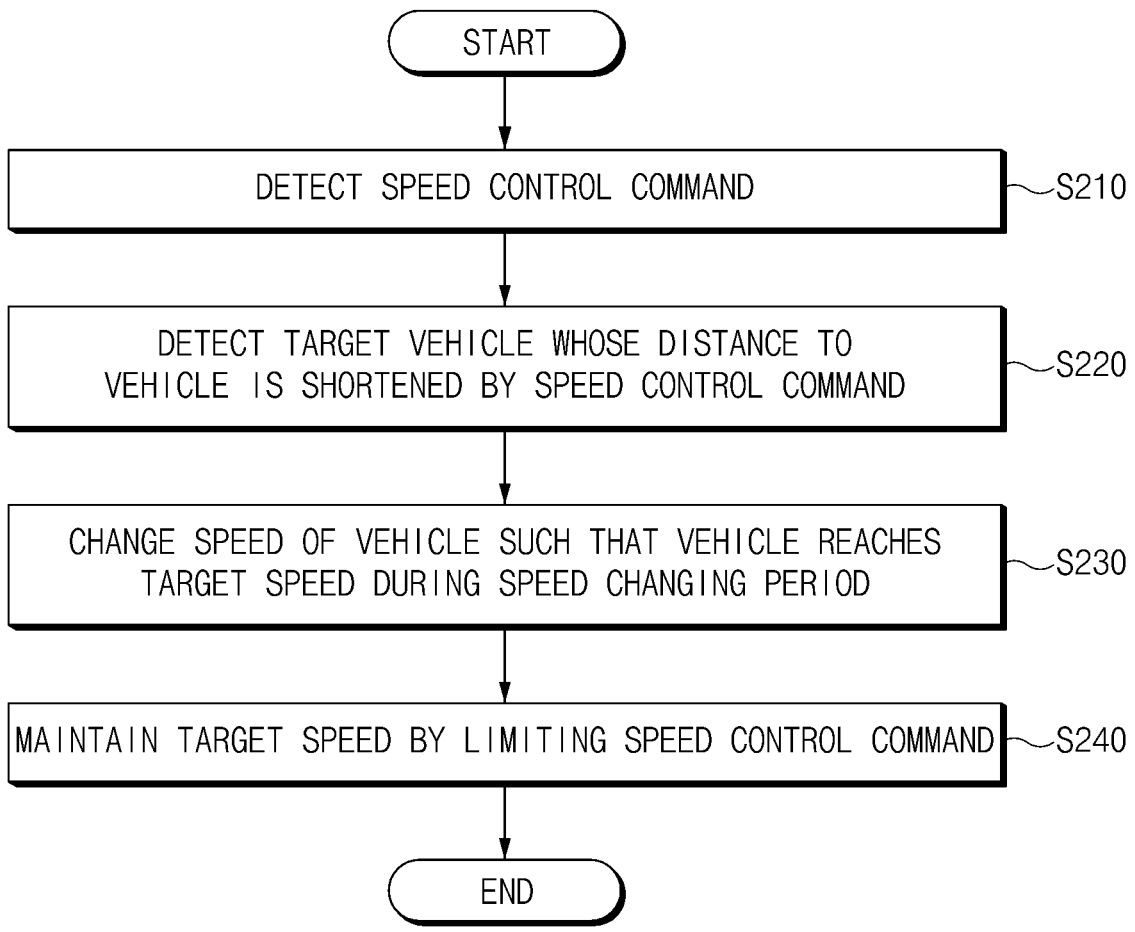
FIG. 2 is a flowchart for illustrating a vehicle control method.

FIG. 2 is a flowchart for illustrating a vehicle control method. Referring to FIG. 2, the vehicle control method is as follows.

In S210, the processor 100 may detect the speed control command for changing the speed of the vehicle.

The processor 100 may detect the speed control command based on at least one of the BPS signal or the APS signal. For example, the processor 100 may detect that the speed control command for the deceleration is input if the change amount of the BPS signal within the unit time is equal to or greater than the first threshold value. The processor 100 may detect that the speed control command for the acceleration is input if the change amount of the APS signal within the unit time is equal to or greater than the second threshold value.

In S220, if the speed control command is executed, the processor 100 may detect the target vehicle of which distance to the vehicle is reduced (e.g., shortened).

For example, if the vehicle decelerates by the BPS signal, the distance between the decelerated vehicle and the following vehicle may be reduced, so that the following vehicle may be detected as the target vehicle. If the vehicle accelerates by the APS signal, the distance between the accelerated vehicle and the leading vehicle may be reduced, so that the leading vehicle may be detected as the target vehicle.

In S230, if the vehicle is traveling at a speed that increases the distance between the vehicle and the target vehicle, the processor 100 may change the speed of the vehicle such that the vehicle reaches the target speed during the speed changing period.

For example, if the target vehicle is the following vehicle, and the speed of the vehicle is higher than that of the following vehicle, the processor 100 may determine that the vehicle is traveling at the speed that increases the distance between the vehicle and the target vehicle. If the target vehicle is the leading vehicle, and the speed of the vehicle is lower than that of the leading vehicle, the processor 100 may determine that the vehicle is traveling at the speed that increases the distance between the vehicle and the target vehicle.

The target speed may correspond to the speed of the target vehicle. The target speed may be set, for example, to the speed of the target vehicle or to be within the range such that the relative speed with respect to the target vehicle is equal to or lower than the preset threshold speed. The processor 100 may control the speed of the vehicle to the target speed, so that the relative speed of the vehicle with respect to the target vehicle may be equal to or lower than the threshold speed. The threshold speed may be determined at the level at which the vehicle and the target vehicle may maintain the similar speed, and may be, for example, determined to the value close to 0.

For example, if the target vehicle is the following vehicle, the processor 100 may decelerate the vehicle to the target speed. If the target vehicle is the leading vehicle, the processor 100 may accelerate the vehicle to the target speed.

In S240, the processor 100 may maintain the target speed by limiting the speed control command after the speed changing period.

For example, even when the BPS signal indicates an amount of deceleration (e.g., braking) to decelerate the vehicle to a speed equal to or lower than the target speed, the processor 100 may ignore or override the indicated amount of deceleration of the BPS signal and maintain the target speed.

Even when the APS signal indicates an amount of acceleration to accelerate the vehicle to a speed equal to or higher than the target speed, the processor 100 may ignore or override the indicated amount of acceleration of the APS signal and maintain the target speed.

Figure 3:
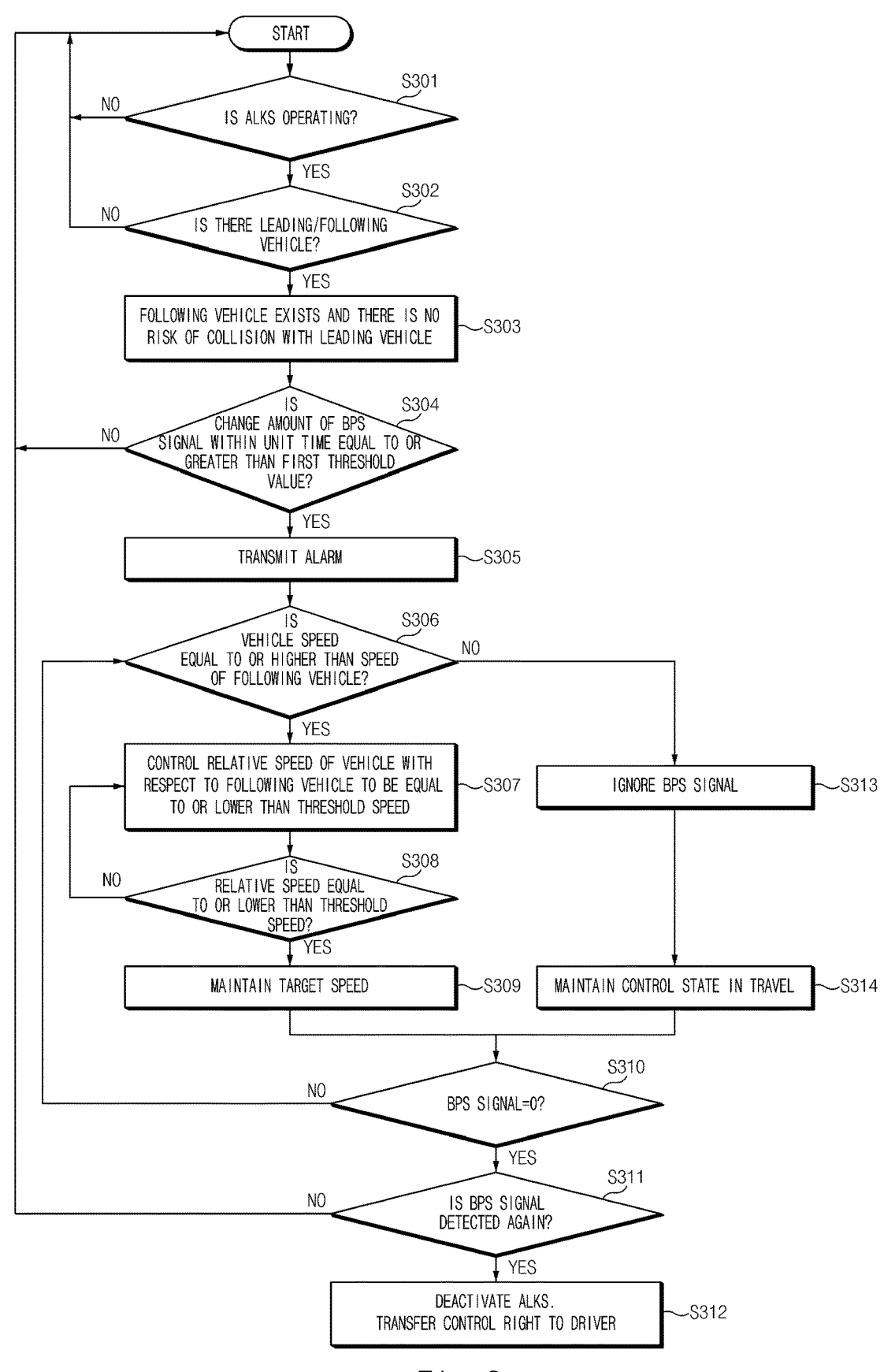
FIG. 3 is a flowchart illustrating a vehicle control method.

FIG. 3 is a flowchart illustrating a vehicle control method. FIG. 3 illustrates a method for controlling the vehicle in response to a rapid deceleration control command.

FIGS. 4 to 9 are diagrams for illustrating the control method illustrated in FIG. 3.

Referring to FIGS. 3 to 9, the vehicle control method will be described as follows.

In S301, the processor 100 may determine whether an automated lane keeping system (ALKS) is operating. When the ALKS is not operating, the vehicle may decelerate or accelerate based on manipulation of the driver.

In S302 and S303, the processor 100 may detect the leading vehicle and/or the following vehicle.

Figure 4:
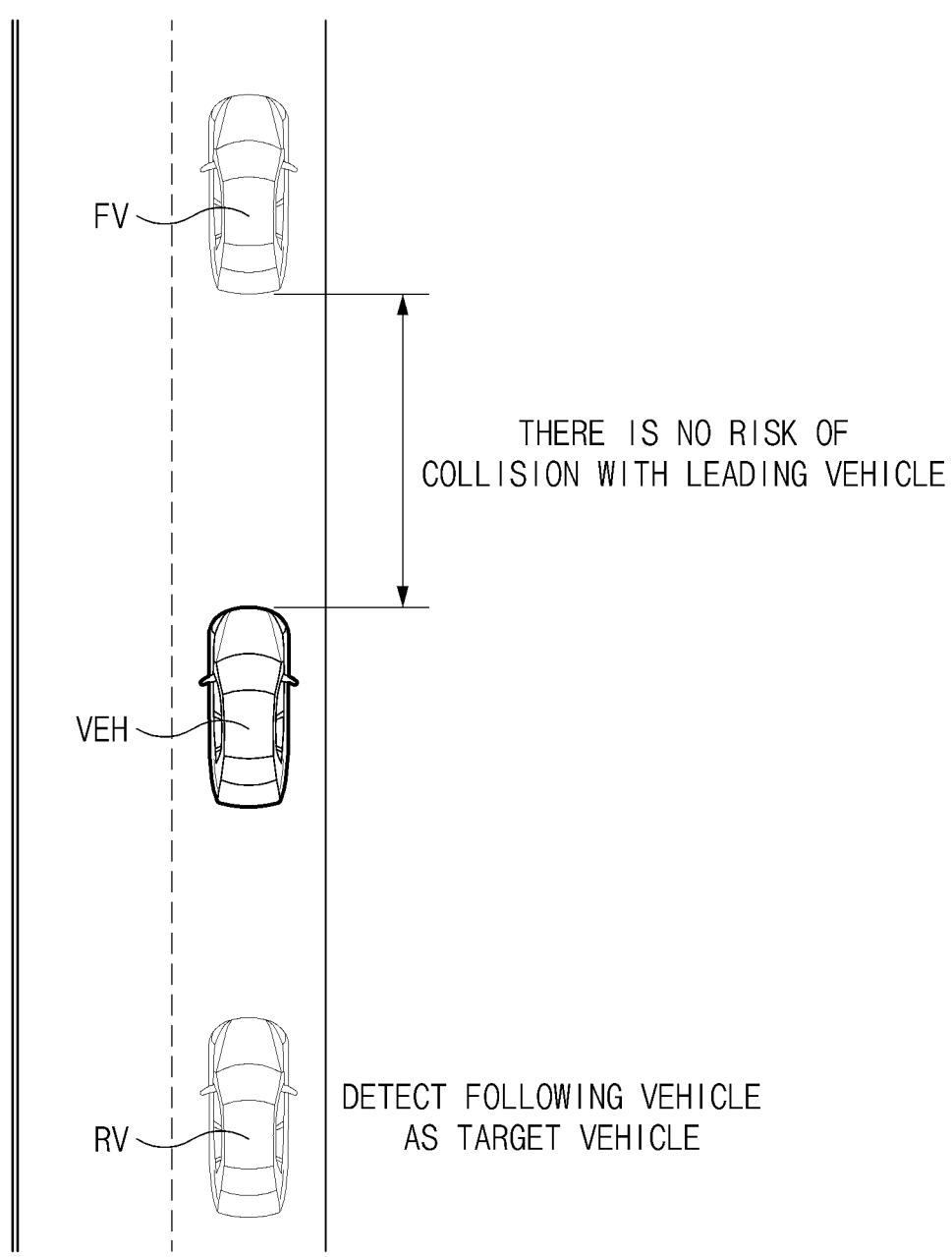
FIG. 4 is a diagram illustrating a following vehicle and a leading vehicle without a risk of collision.

FIG. 4 is a diagram illustrating a following vehicle and a leading vehicle without a risk of collision.

Referring to FIG. 4, the processor 100 may detect a following vehicle RV of a vehicle VEH based on the data obtained via the sensor device 10. The vehicle VEH shown in FIG. 4 may be a vehicle that performs the vehicle control according to one or more aspects of the present disclosure. In the example of the rapid deceleration shown in FIG. 3, the following vehicle RV may be the target vehicle providing a reference for the vehicle VEH to be controlled at the target speed.

The processor 100 may detect a leading vehicle FV based on the data obtained via the sensor device 10. The processor 100 may calculate a time gap and a TTC between the vehicle VEH and the leading vehicle FV based on the data obtained via the sensor device 10, data obtained via the V2X communication, or the like.

If the time gap between the vehicle VEH and the leading vehicle FV is equal to or higher than the certain level and the TTC between the vehicle VEH and the leading vehicle FV is equal to or higher than the certain level, the processor 100 may determine that there is no risk of collision between the vehicle VEH and the leading vehicles FV.

If the following vehicle exists and there is no risk of collision with the leading vehicle FV, the processor 100 may proceed with procedures after S304 to be described below.

If a collision risk is lower than a risk threshold even when the rapid deceleration is performed based on the BPS signal (e.g., when there is no following vehicle), the processor 100 may decelerate the vehicle in response to the BPS signal. If there is a risk of collision with the leading vehicle (e.g., because a BPS signal requesting the rapid deceleration may be determined to be an intention of the driver to avoid the risk of collision with the leading vehicle), the processor 100 may decelerate the vehicle in response to the BPS signal. For example, when there is no following vehicle or there is the risk of collision with the leading vehicle, the rapid deceleration by the driver may be allowed to be performed, so that a procedure to be described later may not be performed.

Accordingly, procedures after S303 may be procedures corresponding to a speed control command requesting the rapid deceleration in the state in which the following vehicle exists and there is no risk of collision (or a collision risk being lower than a risk threshold) with the leading vehicle.

Steps S301 to S303 may also be performed after step S304 to be described later.

In S304, the processor 100 may determine whether the rapid deceleration is requested based on the change amount of the BPS signal within the unit time.

Figure 5:
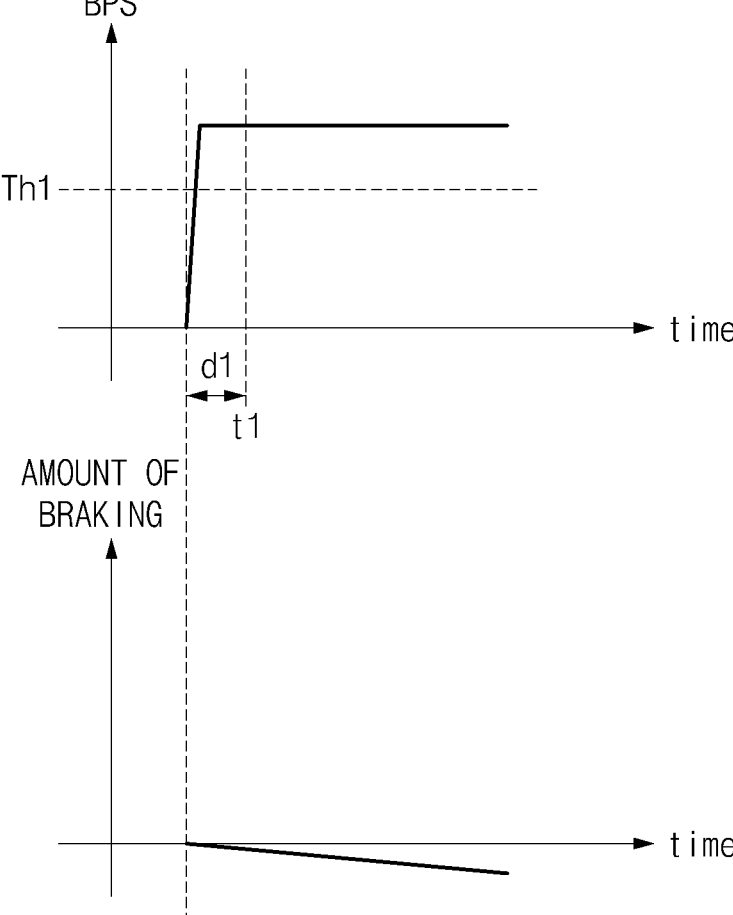
FIG. 5 is a diagram illustrating a method for determining a speed control command requesting rapid deceleration.

FIG. 5 is a diagram illustrating a method for determining a speed control command requesting rapid deceleration.

Referring to FIG. 5, if a change amount of the BPS signal within a unit time d1 is equal to or greater than a first threshold value Th1, the processor 100 may determine that the speed control command requesting the rapid deceleration is input.

In S305, the processor 100 may transmit an alarm signal to generate the alarm via the alarm device 120.

Step S305 may also be performed between steps S309 and S311. For example, the processor 100 may display, on the display, a guide message indicating that the amount of braking by the BPS signal is limited when a procedure of S309 is performed.

Alternatively or additionally, the processor 100 may generate a notification signal to indicate that the sudden braking is recognized and/or to indicate that the amount of braking requesting the sudden braking is limited by outputting a sound via the speaker and/or via vibration of the haptic device.

In S306 and S307, when the vehicle speed is equal to or higher than the speed of the following vehicle, the processor 100 may control a relative speed of the vehicle with respect to the following vehicle to be equal to or lower than the threshold speed.

In S308 and S309, when a relative speed of the vehicle VEH with respect to the target vehicle RV becomes equal to or lower than the threshold speed, the processor 100 may maintain a speed of the vehicle VEH at the target speed.

Steps S306 to S309 will be described with reference to FIGS. 6 and 7 as follows.

Figure 6:
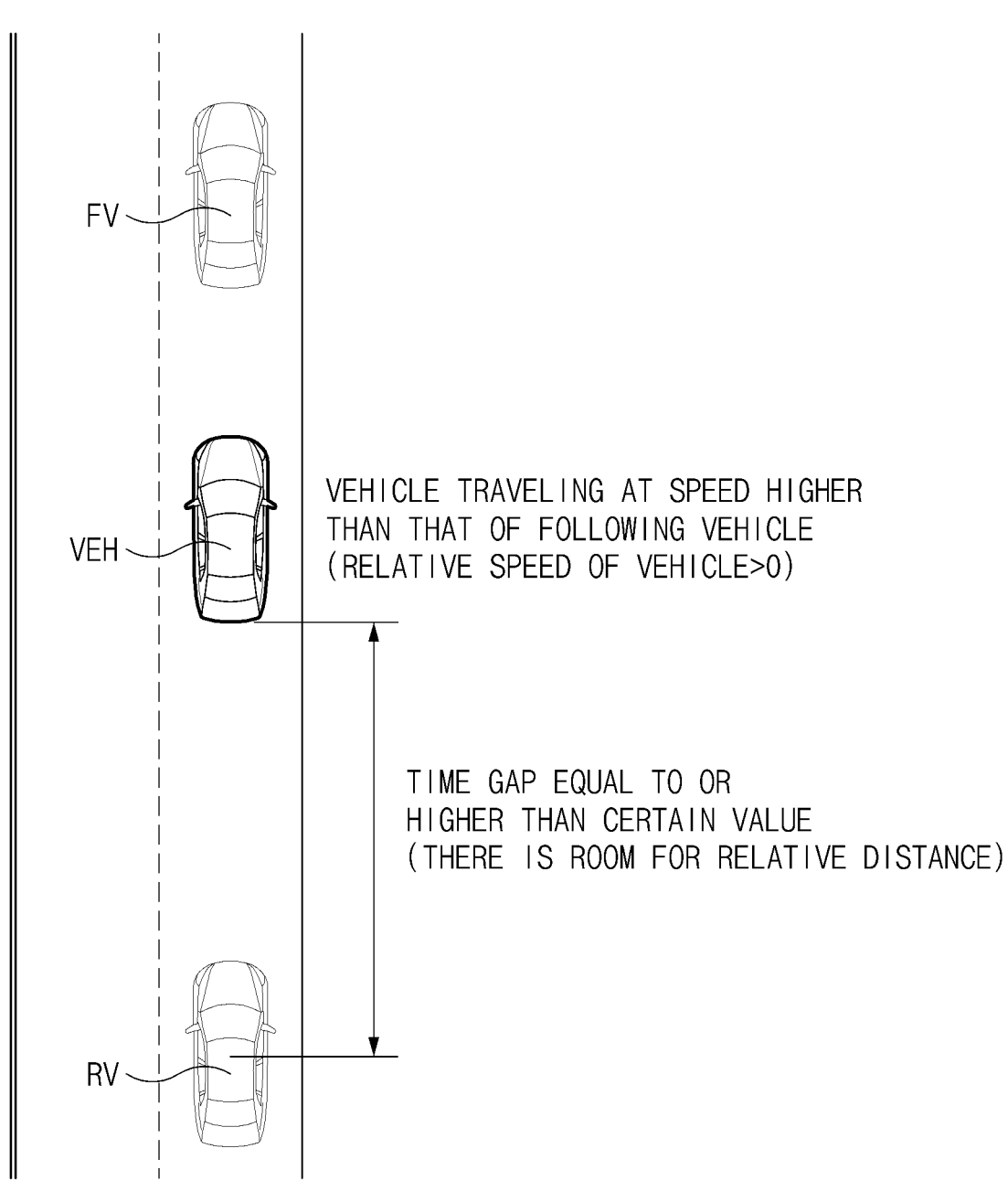
FIG. 6 is a diagram illustrating a vehicle traveling at a higher speed than a following vehicle.
Figure 7:
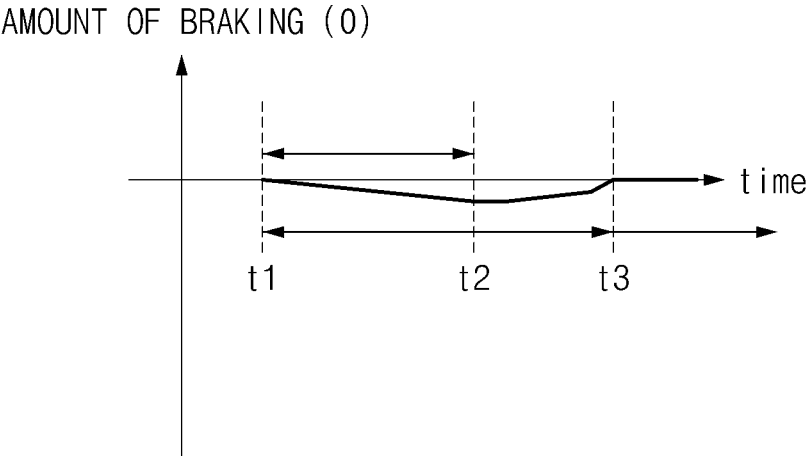
FIG. 7 is a diagram illustrating a method for controlling a speed of a vehicle faster than a following vehicle.

FIG. 6 is a diagram illustrating a vehicle traveling at a higher speed than a following vehicle, and FIG. 7 is a diagram illustrating a method for controlling a speed of a vehicle faster than a following vehicle.

Referring to FIG. 6, if the vehicle VEH is faster than the following vehicle RV corresponding to the target vehicle, the processor 100 may lower the speed of the vehicle VEH to the target speed in response to the BPS signal.

For example, as shown in FIG. 7, during a speed changing period from a first timing t1 at which the rapid deceleration is determined to a third timing t3, the processor 100 may adjust the amount of braking such that the speed of the vehicle VEH reaches the target speed. The processor 100 may (e.g., constantly) increase the amount of braking until a second timing t2 during the speed changing period. The processor 100 may control the vehicle VEH at the target speed while reducing the amount of braking from the second timing t2 to the third timing t3, thereby reducing a discomfort of the driver caused by a rapid speed change.

After the third timing t3, even when the BPS signal is output with a value equal to or higher than 0, the processor 100 may limit the amount of braking (e.g., the processor 100 may ignore and/or override the BPS signal).

Step S306 may include a procedure for identifying a time gap between the vehicle VEH and the following vehicle RV, which is the target vehicle, and steps S307 to S309 may be performed when the time gap between the vehicle VEH and the following vehicle RV is equal to or greater than the threshold time.

In S310, the processor 100 may determine whether the BPS signal is 0.

If the BPS signal is not 0, the processor 100 may return to the procedure of S306. For example, if an external force is continuously applied to the brake pedal, the processor 100 may repeat the procedure of maintaining the speed of the vehicle VEH at the target speed by adjusting the amount of braking.

After the BPS signal is output as 0, in S311, the processor 100 may monitor whether the BPS signal is detected again within a certain time period.

If the BPS signal is detected again within the certain time period (e.g., when it is determined that the external force is applied to the brake pedal again), in S312, the processor 100 may deactivate an ALKS operation mode and transfer a control right of the vehicle VEH to the driver.

In step S306, when the speed of the vehicle VEH is lower than that of the following vehicle RV, in S313 and S314, the processor 100 may ignore that the BPS signal is detected and maintain a control state of the vehicle VEH in travel. Steps S313 and S314 are to prevent a risk of collision with the following vehicle RV from occurring as the braking is performed while the speed of the vehicle VEH is lower than that of the following vehicle RV.

Steps S313 and S314 will be described with reference to FIGS. 8 and 9 as follows.

Figure 8:
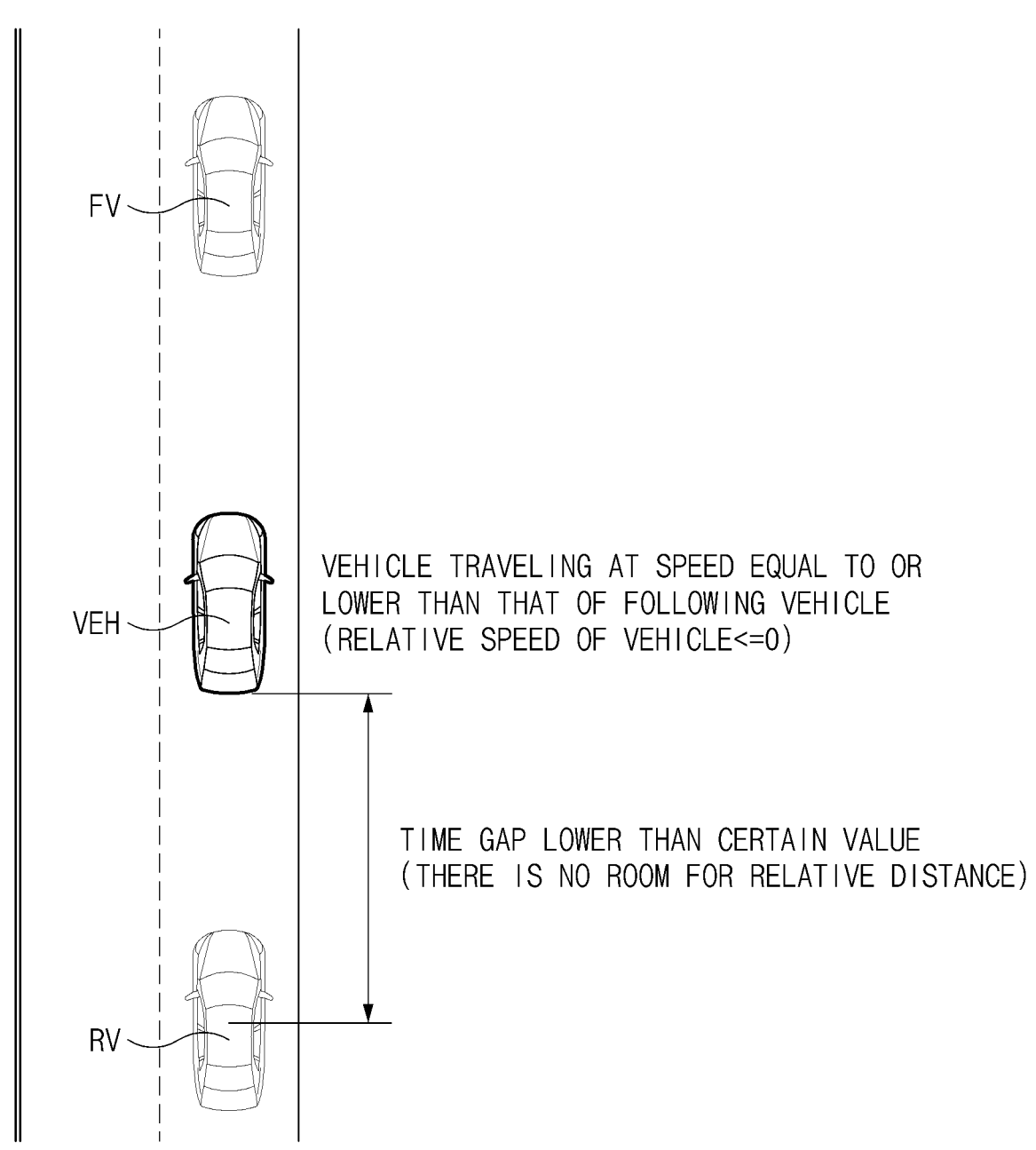
FIG. 8 is a diagram illustrating a vehicle traveling at a lower speed than a following vehicle.
Figure 9:
FIG. 9 is a diagram illustrating a method for controlling a speed of a vehicle slower than a following vehicle.

FIG. 8 is a diagram illustrating a vehicle traveling at a lower speed than a following vehicle, and FIG. 9 is a diagram illustrating a method for controlling a speed of a vehicle slower than a following vehicle.

Referring to FIG. 8, when the speed of the vehicle VEH is lower than or equal to that of the following vehicle RV corresponding to the target vehicle, the processor 100 may ignore the BPS signal and may not perform the braking of the vehicle VEH.

For example, as shown in FIG. 9, the processor 100 may not perform the braking of the vehicle even when the rapid deceleration is determined at the first timing t1.

Step S306 may include a procedure of identifying the time gap between the vehicle VEH and the following vehicle RV, which is the target vehicle, and steps S313 to S314 may proceed when the time gap between the vehicle VEH and the following vehicle RV is smaller than the threshold time.

Although not shown in the flowchart in FIG. 3, step S303 may include a procedure of detecting the dangerous leading vehicle with the risk of collision. The processor 100 may detect a vehicle with a time gap equal to or smaller than the threshold time and a TTC equal to or smaller than another threshold time among the leading vehicles as the dangerous leading vehicle.

The processor 100 may perform the braking of the vehicle VEH by performing the procedure of S312 when the sudden braking of the vehicle is requested in the state in which the dangerous leading vehicle is detected. This may be because the requesting of the sudden braking of the vehicle in the presence of the dangerous leading vehicle may be determined as manipulation for avoiding a collision with the dangerous leading vehicle.

Figure 10:
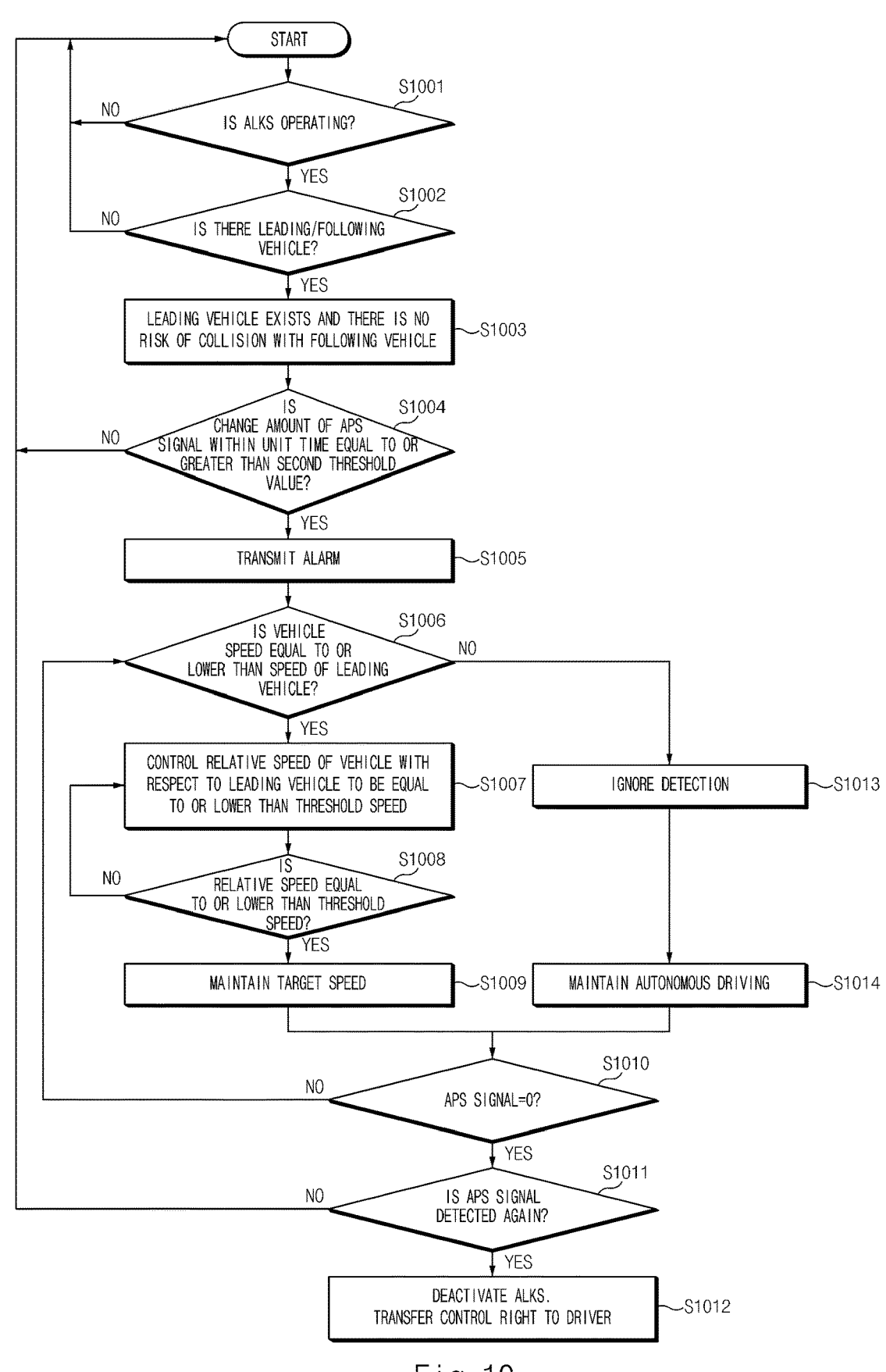
FIG. 10 is a flowchart illustrating a vehicle control method.

FIG. 10 is a flowchart illustrating a vehicle control method. FIG. 10 illustrates a method for controlling the vehicle in response to a rapid acceleration control command.

FIGS. 11 to 16 are diagrams for illustrating the control method shown in FIG. 10.

Referring to FIGS. 10 to 16, the vehicle control method according to the present disclosure is as follows.

In S1001, the processor 100 may determine whether the automated lane keeping system (ALKS) is operating. If the ALKS system is not operating, the vehicle may decelerate or accelerate based on the manipulation of the driver.

In S1002 and S1003, the processor 100 may detect the leading vehicle and/or the following vehicle.

Figure 11:
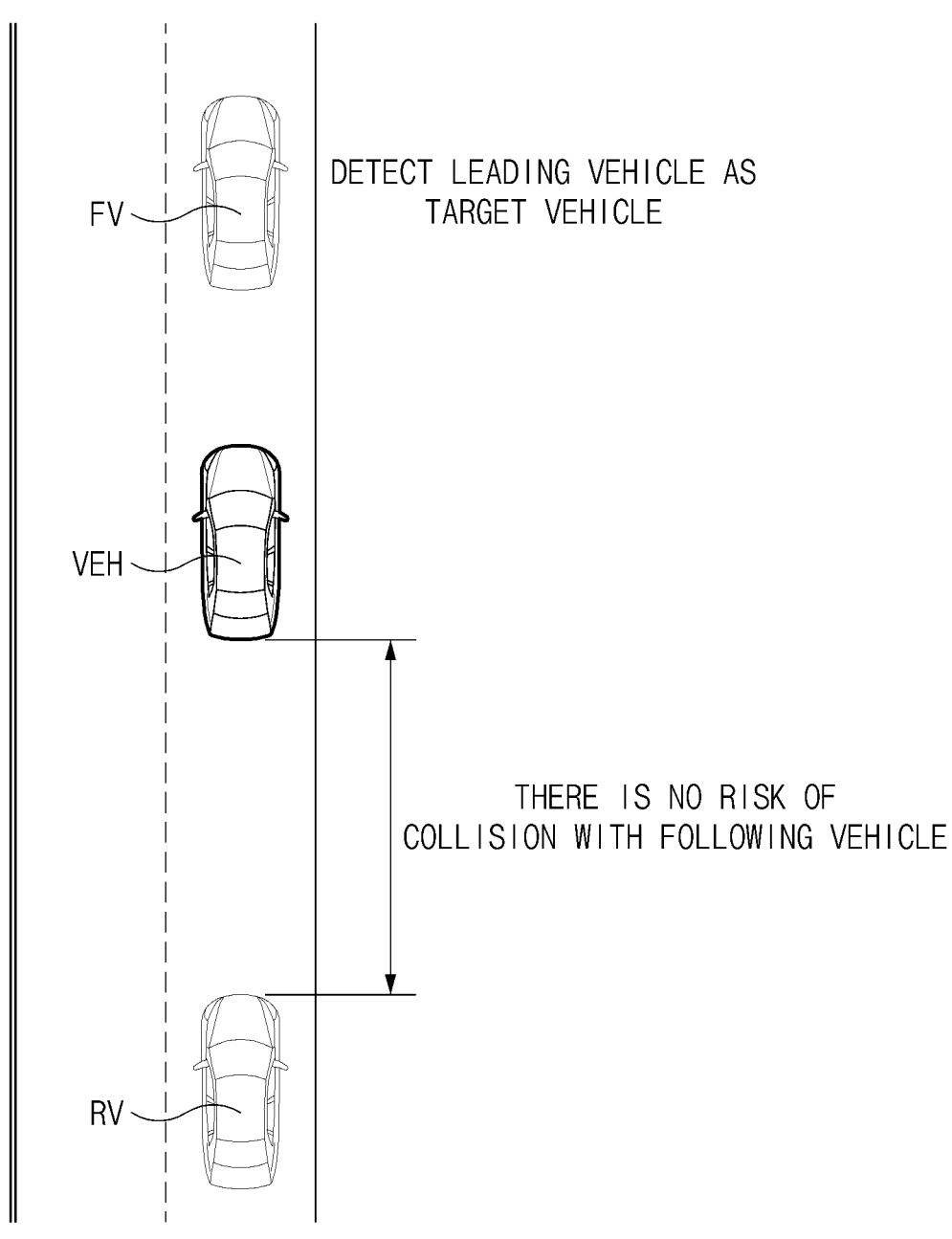
FIG. 11 is a diagram illustrating a leading vehicle and a following vehicle without a risk of collision.

FIG. 11 is a diagram illustrating a leading vehicle and a following vehicle (e.g., a following vehicle without a risk of collision or a collision risk lower than a risk threshold).

Referring to FIG. 11, the processor 100 may detect the leading vehicle FV of the vehicle VEH based on the data obtained via the sensor device 10. The vehicle VEH shown in FIG. 11 may be a vehicle that performs the vehicle control according to the present disclosure. In the example of the rapid acceleration shown in FIG. 11, the leading vehicle FV may be the target vehicle providing the reference for the vehicle VEH to be controlled at the target speed.

The processor 100 may detect the following vehicle RV based on the data obtained via the sensor device 10. The processor 100 may calculate the time gap and a TTC between the vehicle VEH and the following vehicle RV based on the data obtained via the sensor device 10 and/or the data obtained via the V2X communication.

If the time gap between the vehicle VEH and the following vehicle RV is equal to or higher than a certain level of time gap, and the TTC between the vehicle VEH and the following vehicle RV is equal to or higher than a certain level of TTC, the processor 100 may determine that there is no risk of collision (or a collision risk lower than a risk threshold) between the vehicle VEH and the following vehicle RV.

If the leading vehicle FV exists and there is no risk of collision (or a collision risk lower than the risk threshold) with the following vehicle RV, the processor 100 may proceed with procedures after S1004 to be described later.

If there is no leading vehicle, because there is no possibility of collision with a leading vehicle even when the rapid acceleration is performed based on the APS signal, the processor 100 may accelerate the vehicle in response to the APS signal. If there is a risk of collision with the following vehicle (e.g., because the APS signal requesting the rapid acceleration may be determined as the intention of the driver to avoid the risk of collision with the following vehicle), the processor 100 may accelerate the vehicle in response to the APS signal. For example, if there is no leading vehicle FV or if there is a risk of collision with the following vehicle RV, the rapid acceleration by the driver may be allowed to be performed, so that a procedure to be described later may not be performed.

Accordingly, procedures after S1003 may be procedures corresponding to a speed control command requesting the rapid acceleration in the state in which the leading vehicle FV exists and there is no risk of collision (or a collision risk lower than the risk threshold) with the following vehicle RV.

Steps S1001 to S1003 may also be performed after step S1004 to be described later.

In S1004, the processor 100 may determine whether the rapid acceleration is requested based on the change amount of the APS signal.

Figure 12:
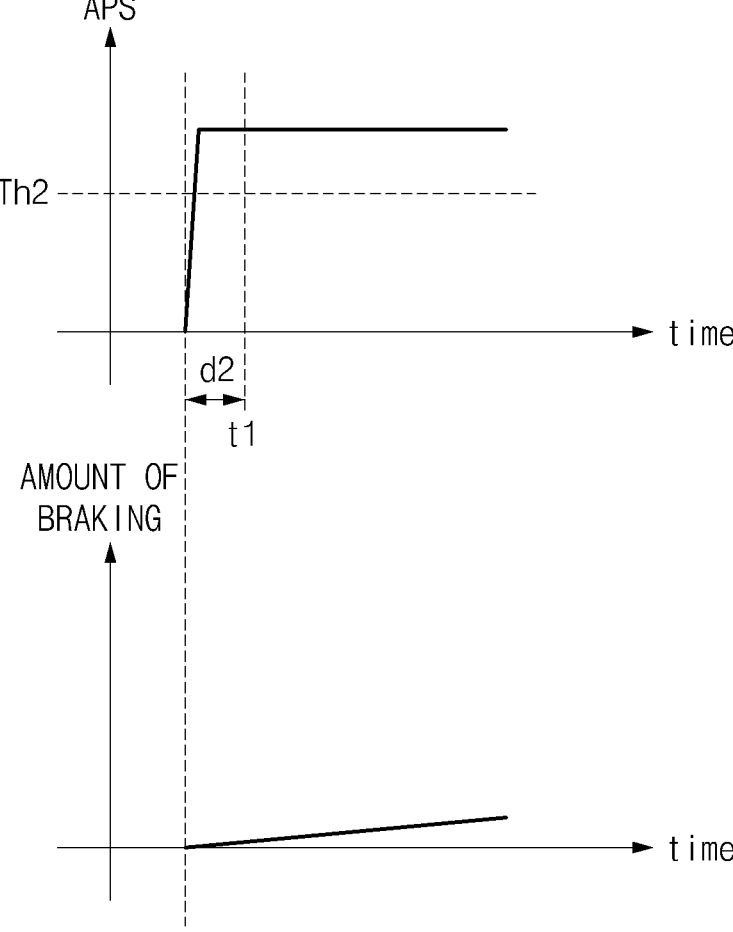
FIG. 12 is a diagram illustrating a method for determining a speed control command requesting rapid acceleration.

FIG. 12 is a diagram illustrating a method for determining a speed control command requesting rapid acceleration.

Referring to FIG. 12, if a change amount of the APS signal within a unit time d2 is equal to or greater than a second threshold value Th2, the processor 100 may determine that the speed control command requesting the rapid acceleration is input.

In S1005, the processor 100 may transmit an alarm signal to generate an alarm via the alarm device 120.

Step S1005 may proceed between steps S1009 and S1011. For example, the processor 100 may display, on the display, the guide message indicating that the amount of acceleration by the APS signal is limited when a procedure of S1009 is performed.

Alternatively or additionally, the processor 100 may generate a notification to indicate that the rapid acceleration is recognized and/or to indicate that the amount of acceleration requesting the rapid acceleration is limited by outputting the sound via the speaker and/or via the vibration of the haptic device.

In S1006 and S1007, if the vehicle speed is equal to or higher than the speed of the leading vehicle, which is the target vehicle, the processor 100 may control a relative speed of the vehicle with respect to the leading vehicle to be equal to or lower than the threshold speed.

In S1008 and S1009, if a relative speed of the vehicle VEH with respect to the target vehicle FV becomes equal to or lower than the threshold speed, the processor 100 may maintain the speed of the vehicle VEH at the target speed.

Steps S1006 to S1009 will be described with reference to FIGS. 13 and 14 as follows.

Figure 13:
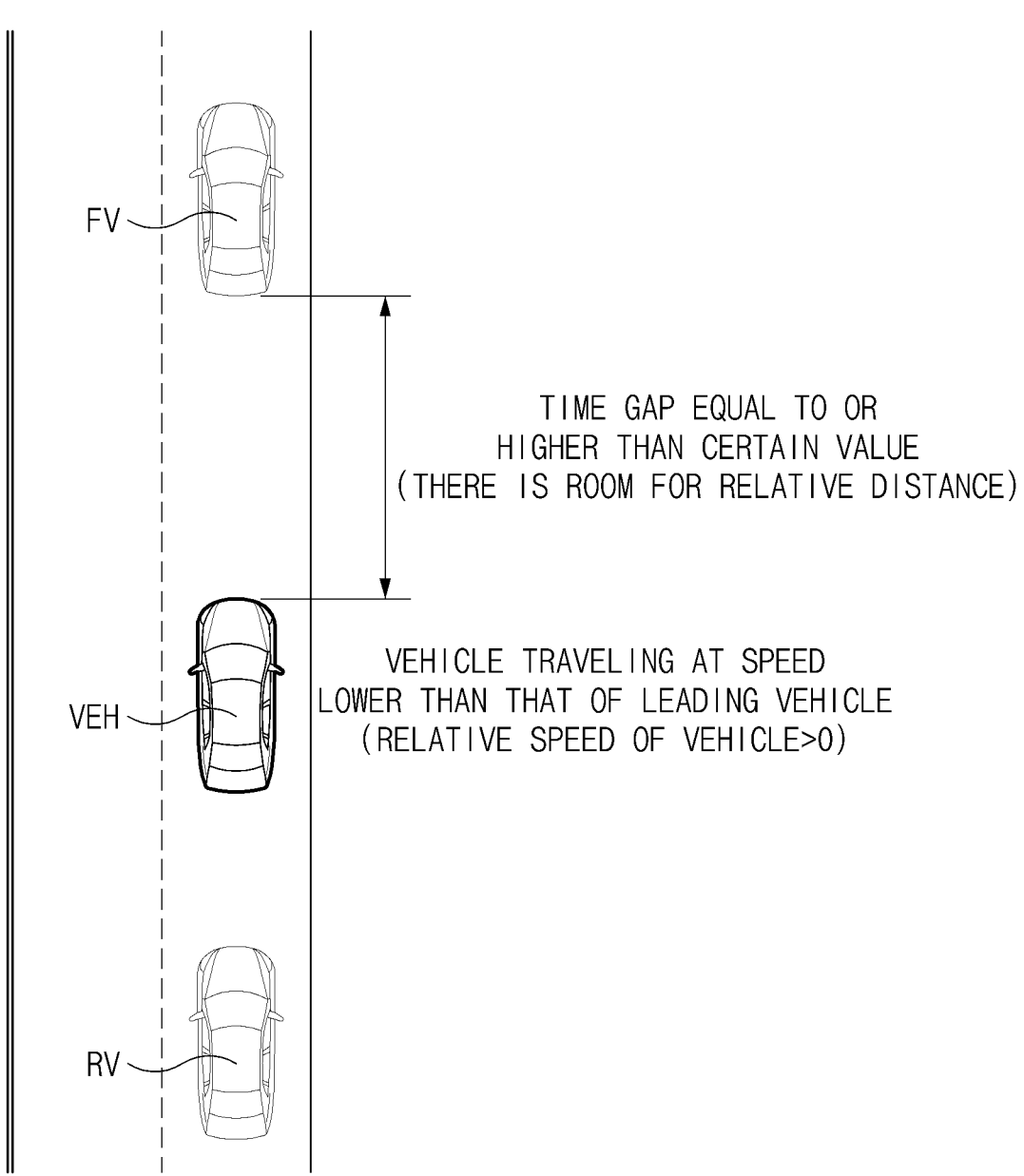
FIG. 13 is a diagram illustrating a vehicle traveling at a lower speed than a leading vehicle.
Figure 14:
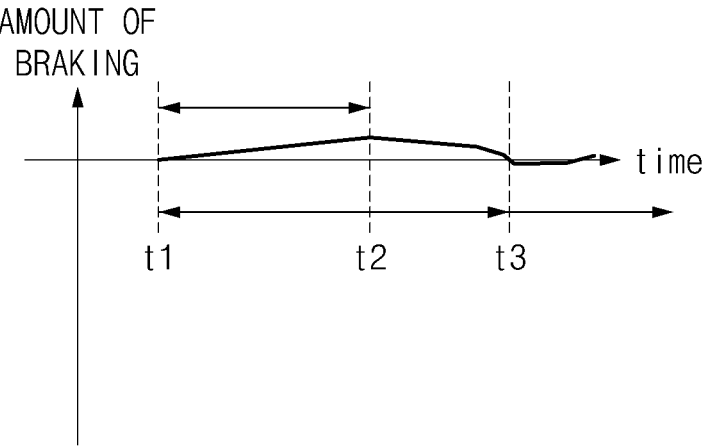
FIG. 14 is a diagram illustrating a method for controlling a speed of a vehicle slower than a leading vehicle.

FIG. 13 is a diagram illustrating a vehicle traveling at a lower speed than a leading vehicle, and FIG. 14 is a diagram illustrating a method for controlling a speed of a vehicle slower than a leading vehicle.

Referring to FIG. 13, if the vehicle VEH is slower than the leading vehicle FV corresponding to the target vehicle, the processor 100 may increase the speed of the vehicle VEH to the target speed in response to the APS signal.

For example, as shown in FIG. 14, during a speed changing period from the first timing t1 at which the rapid acceleration is determined to the third timing t3, the processor 100 may adjust the amount of acceleration such that the speed of the vehicle VEH reaches the target speed. The processor 100 may (e.g., constantly) increase the amount of acceleration until the second timing t2 during the speed changing period. The processor 100 may control the vehicle VEH at the target speed while reducing the amount of acceleration from the second timing t2 to the third timing t3, thereby reducing the discomfort of the driver caused by the rapid speed change.

After the third timing t3, even when the APS signal is output with the value equal to or higher than 0, the processor 100 may limit the amount of acceleration.

Step S1006 may include a procedure for identifying a time gap between the vehicle VEH and the leading vehicle FV, which is the target vehicle, and steps S1007 to S1009 may be performed when the time gap between the vehicle VEH and the leading vehicle FV is equal to or greater than the threshold time.

In S1010, the processor 100 may determine whether the APS signal is 0.

If the APS signal is not 0, the processor 100 may return to the procedure of S1006. For example, when an external force is continuously applied to the accelerator pedal, the processor 100 may repeat the procedure of maintaining the speed of the vehicle VEH at the target speed by adjusting the amount of acceleration.

After the APS signal is output as 0, in S1011, the processor 100 may monitor whether the APS signal is detected again within a certain time period.

If the APS signal is detected again within the certain time period (e.g., when it is determined that the external force is applied to the accelerator pedal again), in S1012, the processor 100 may deactivate the ALKS operation mode and transfer the control right of the vehicle VEH to the driver.

In step S1006, if the speed of the vehicle VEH is equal to or higher than that of the leading vehicle FV, in S1013 and S1014, the processor 100 may ignore the detected APS signal and maintain a control state of the vehicle VEH in travel. Steps S1013 and S1014 may be to prevent a risk of collision with the leading vehicle FV from occurring as the acceleration is performed while the speed of the vehicle VEH is higher than that of the leading vehicle FV.

Steps S1013 and S1014 will be described with reference to FIGS. 15 and 16 as follows.

Figure 15:
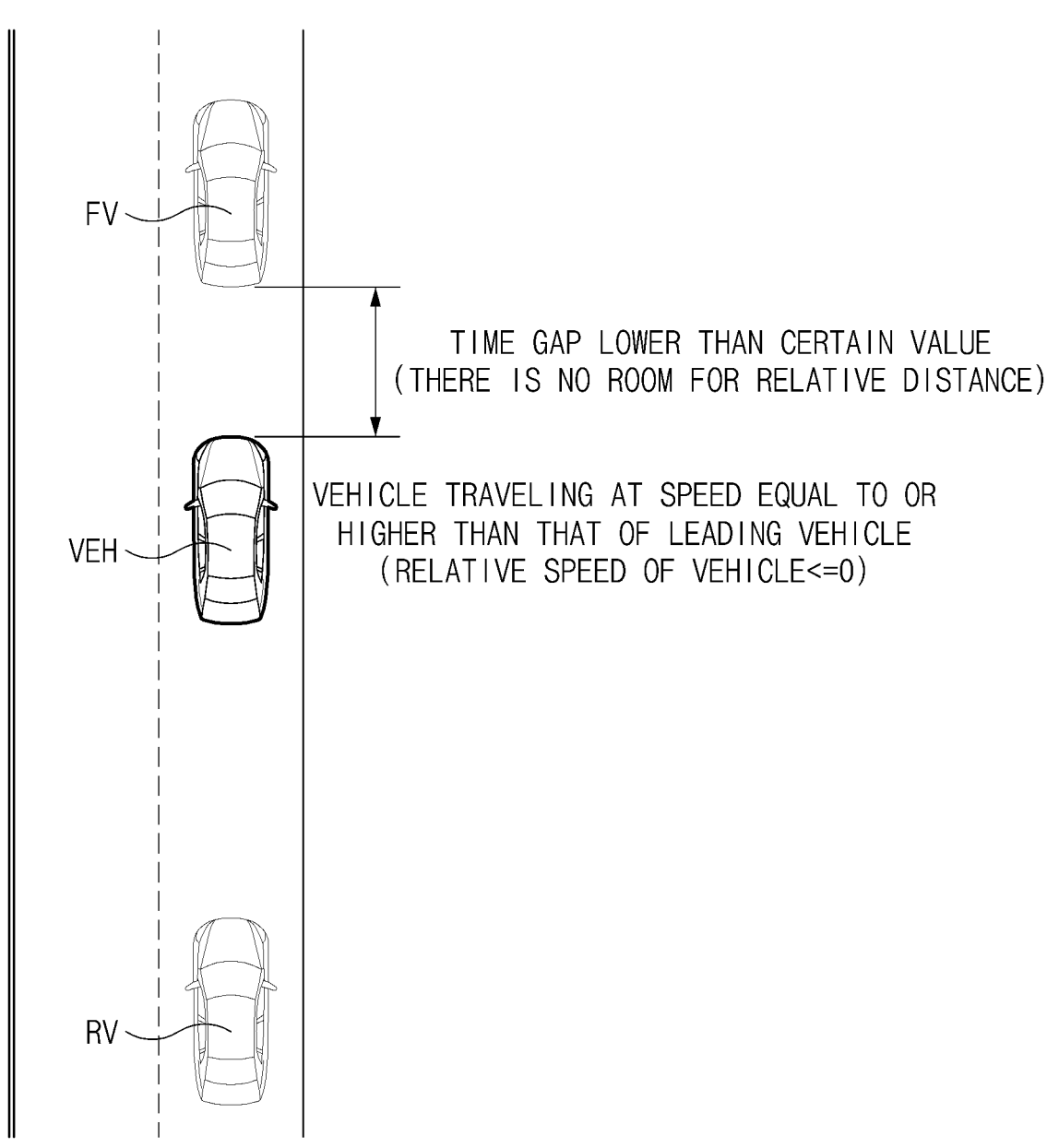
FIG. 15 is a diagram illustrating a vehicle traveling at a speed equal to or higher than that of a leading vehicle.
Figure 16:
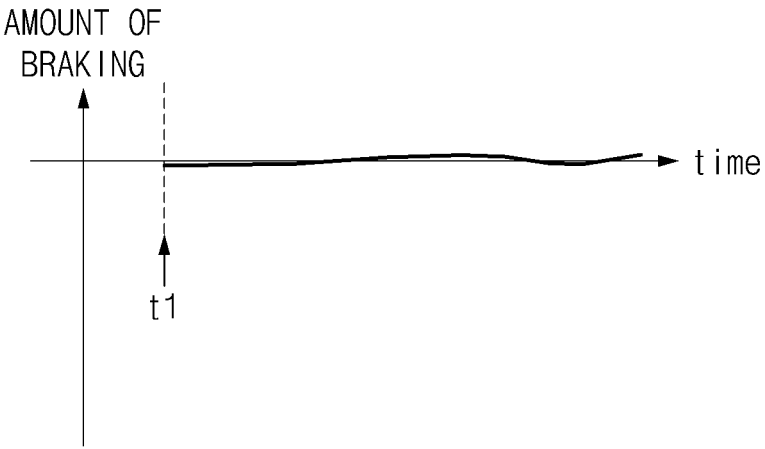
FIG. 16 is a diagram illustrating a method for controlling a speed of a vehicle equal to or higher than that of a leading vehicle.

FIG. 15 is a diagram illustrating a vehicle traveling at a speed equal to or higher than that of a leading vehicle, and FIG. 16 is a diagram illustrating a method for controlling a speed of a vehicle equal to or higher than that of a leading vehicle.

Referring to FIG. 15, if the speed of the vehicle VEH is equal to or higher than that of the leading vehicle FV corresponding to the target vehicle, the processor 100 may ignore the APS signal and may not perform the acceleration of the vehicle VEH.

For example, as shown in FIG. 16, the processor 100 may not perform the acceleration of the vehicle even when the rapid acceleration is determined at the first timing t1.

Step S1006 may include a procedure of identifying the time gap between the vehicle VEH and the leading vehicle FV, which is the target vehicle, and steps S1013 to S1014 may proceed when the time gap between the vehicle VEH and the leading vehicle FV is smaller than the threshold time.

Although not shown in the flowchart in FIG. 10, step S1003 may include a procedure of detecting the dangerous following vehicle with the risk of collision. The processor 100 may detect a vehicle with a time gap equal to or smaller than the threshold time and a TTC equal to or smaller than another threshold time among the following vehicles as the dangerous following vehicle.

The processor 100 may perform the acceleration of the vehicle VEH by performing the procedure of S1012 when the rapid acceleration of the vehicle is requested in the state in which the dangerous following vehicle is detected. This may be because the requesting of the rapid acceleration of the vehicle in the presence of the dangerous following vehicle may be determined as manipulation for avoiding a collision with the dangerous following vehicle.

According to an aspect of the present disclosure, a device for controlling a vehicle includes a sensor device, a processor, and a travel control device. The sensor device generates a speed control command for changing a speed of the vehicle. The processor detects a target vehicle whose distance to the vehicle is shortened based on that the speed control command is executed, and changes the speed of the vehicle to a target speed at which a speed difference from the target vehicle is equal to or lower than a preset threshold speed during a speed changing period when the vehicle is traveling at a speed increasing the distance from the target vehicle. The travel control device changes the speed of the vehicle based on a control signal.

In one implementation, the processor may decelerate the vehicle such that a relative speed of the vehicle with respect to a following vehicle becomes equal to or lower than the threshold speed in response to a speed control command requesting rapid deceleration when the vehicle is faster than the following vehicle corresponding to the target vehicle.

In one implementation, the processor may decelerate the vehicle in response to a brake-pedal position sensor signal after the speed changing period when a dangerous leading vehicle with a risk of collision with the vehicle is detected based on a time to collision.

In one implementation, the processor may accelerate the vehicle such that a relative speed of the vehicle with respect to a leading vehicle becomes equal to or lower than the threshold speed in response to a speed control command requesting rapid acceleration when the vehicle is slower than the leading vehicle corresponding to the target vehicle.

In one implementation, the processor may accelerate the vehicle in response to an accelerator position sensor signal after the speed changing period when a dangerous following vehicle with a risk of collision with the vehicle is detected based on a time to collision.

In one implementation, the device may further include an alarm device for transmitting an alarm to inform a driver of the vehicle that the speed control command is limited, and the processor may transfer a control right of the vehicle to the driver when the speed control command is detected again after transmitting the alarm.

According to an aspect of the present disclosure, a method for controlling a vehicle includes detecting a speed control command for changing a speed of a vehicle, detecting a target vehicle whose distance to the vehicle is shortened when the speed control command is executed, changing the speed of the vehicle to a target speed during a speed changing period when the vehicle is traveling at a speed increasing the distance from the target vehicle, wherein a speed difference from the target vehicle is equal to or lower than a preset threshold speed at the target speed, and maintaining the target speed by limiting the speed control command after the speed changing period.

In one implementation, the detecting of the speed control command may include identifying that a change amount of a brake-pedal position sensor signal of the vehicle within a unit time is equal to or greater than a first threshold value.

In one implementation, the changing of the speed of the vehicle may include decelerating the vehicle such that a relative speed of the vehicle with respect to a following vehicle becomes equal to or lower than the threshold speed when the vehicle is faster than the following vehicle corresponding to the target vehicle.

In one implementation, the detecting of the target vehicle may further include detecting a dangerous leading vehicle with a risk of collision with the vehicle based on a time to collision, and the method may further include decelerating the vehicle in response to the brake-pedal position sensor signal after the speed changing period when the dangerous leading vehicle is detected.

In one implementation, the detecting of the speed control command may include identifying that a change amount of an accelerator position sensor signal of the vehicle within a unit time is equal to or greater than a second threshold value.

In one implementation, the changing of the speed of the vehicle may include accelerating the vehicle such that a relative speed of the vehicle with respect to a leading vehicle becomes equal to or lower than the threshold speed when the vehicle is slower than the leading vehicle corresponding to the target vehicle.

In one implementation, the detecting of the target vehicle may further include detecting a dangerous following vehicle with a risk of collision with the vehicle based on a time to collision, and the method may further include accelerating the vehicle in response to the accelerator position sensor signal after the speed changing period when the dangerous following vehicle is detected.

In one implementation, the changing of the speed of the vehicle may be performed when a time gap between the vehicle and the target vehicle is equal to or greater than a preset threshold time.

In one implementation, the method may further include transmitting an alarm to inform a driver of the vehicle that the speed control command is limited, and transferring a control right of the vehicle to the driver when the speed control command is detected again after transmitting the alarm.

Figure 17:
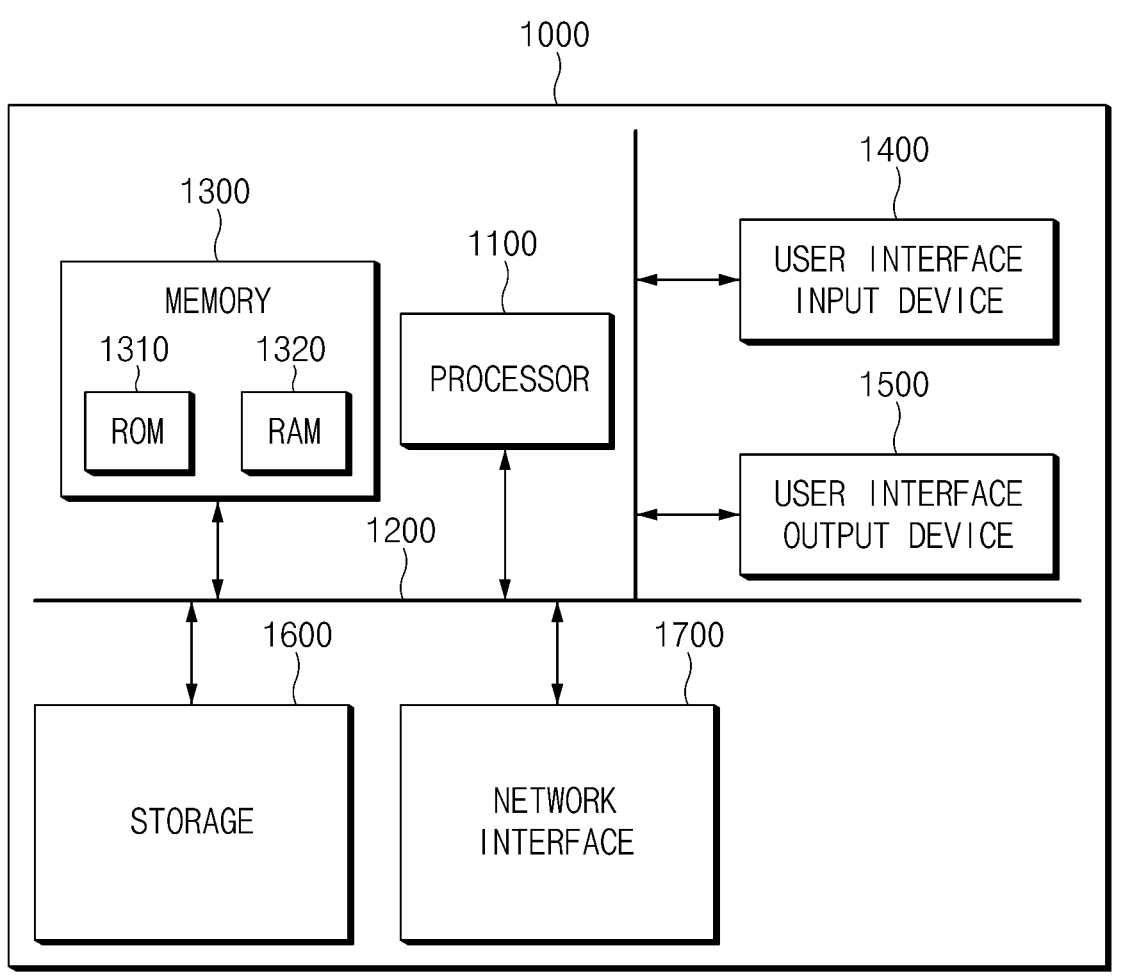
FIG. 17 is a diagram illustrating a computing system.

FIG. 17 is a diagram illustrating a computing system. With reference to FIG. 17, a computing system 1000 may include at least one processor 1100, a memory 1300, a user interface input device 1400, a user interface output device 1500, storage 1600, and a network interface 1700 connected via a bus 1200.

The processor 1100 may be a central processing unit (CPU) and/or a semiconductor device that performs processing on commands stored in the memory 1300 and/or the storage 1600. The memory 1300 and the storage 1600 may include various types of volatile or non-volatile storage media. For example, the memory 1300 may include a ROM (Read Only Memory) and a RAM (Random Access Memory).

Thus, the operations of the method or the algorithm described in connection with the features disclosed herein may be embodied directly in hardware or a software module executed by the processor 1100, or in a combination thereof. The software module may reside on a storage medium (e.g., the memory 1300 and/or the storage 1600) such as a RAM, a flash memory, a ROM, an EPROM, an EEPROM, a register, a hard disk, a removable disk, and a CD-ROM.

The exemplary storage medium is coupled to the processor 1100, which may read information from, and write information to, the storage medium. In another method, the storage medium may be integral with the processor 1100. The processor and the storage medium may reside within an application specific integrated circuit (ASIC). The ASIC may reside within the user terminal. In another method, the processor and the storage medium may reside as individual components in the user terminal.

The description above is merely illustrative of the technical idea of the present disclosure, and various modifications and changes may be made by those skilled in the art without departing from the essential characteristics of the present disclosure.

According to one or more aspects of the present disclosure, the control right of the vehicle may be adjusted more efficiently depending on the travel environment.

According to one or more aspects of the present disclosure, when it is determined that there is a possibility of a collision with adjacent vehicles when the vehicle is controlled by an operation of the driver, the acceleration or the deceleration of the vehicle may be limited to reduce the possibility of the collision with the adjacent vehicles.

Various effects identified directly or indirectly through the present document may be provided.

Hereinabove, although the present disclosure has been described with reference to various examples and the accompanying drawings, aspects of the present disclosure are not limited thereto, but may be variously modified and altered by those skilled in the art to which the present disclosure pertains without departing from the spirit and scope of the present disclosure claimed in the following claims.

What is claimed is:

1. A device for controlling a first vehicle, the device comprising:
a memory storing at least one instruction; and
a processor,
wherein the at least one instruction is configured to, when executed by the processor, cause the device to:
determine, based on at least one sensor, whether a target vehicle exists based on detecting a speed control command according to a user input, wherein the target vehicle is a second vehicle for which a distance to the first vehicle is predicted to decrease based on the speed control command being executed;
based on absence of the target vehicle, control a speed of the first vehicle at a first rate of speed change corresponding to the speed control command;
based on presence of the target vehicle, generate a control signal for changing, at a second rate of speed change, the speed of the first vehicle to a target speed, and control the first vehicle, based on the control signal, to change the speed of the first vehicle to the target speed during a speed changing period;
control autonomous driving of the first vehicle, wherein the speed control command is detected during the autonomous driving of the first vehicle;
after changing the speed of the first vehicle to the target speed, maintain the target speed; and
based on an additional speed control command received while maintaining the target speed, transfer a control authority of the first vehicle to a driver of the first vehicle,
wherein the control signal is generated based on a determination that the first vehicle is traveling at a speed that increases the distance between the first vehicle and the target vehicle, and
wherein the target speed is determined based on a speed of the target vehicle.

2. The device of claim 1, wherein the at least one instruction, when executed by the processor, is configured to cause the device to:
change, based on a determination that the first vehicle is faster than the target vehicle, the speed of the first vehicle to the target speed by reducing the speed of the first vehicle such that a difference between the speed of the first vehicle and the speed of the target vehicle becomes less than or equal to a speed difference threshold, and
determine that the first rate of speed change of the first vehicle is a deceleration rate that causes a collision of the first vehicle and the target vehicle,
wherein the target vehicle is a following vehicle that follows the first vehicle, and
wherein the second rate of speed change for changing the speed of the first vehicle to the target speed is lower than the first rate of speed change of the first vehicle.

3. The device of claim 2, wherein the at least one instruction, when executed by the processor, is configured to cause the device to:
after the speed changing period, decelerate the first vehicle based on:
a brake-pedal position sensor signal; and 19
20 a leading vehicle, in a position ahead of the first vehicle, associated with a risk of collision with the first vehicle being detected based on a time to collision.

4. The device of claim 1, wherein the at least one instruction, when executed by the processor, is configured to cause the device to:

change, based on a determination that the first vehicle is slower than the target vehicle, the speed of the first vehicle to the target speed by increasing the speed of the first vehicle such that a difference between the speed of the first vehicle and the speed of the target vehicle becomes less than or equal to a speed difference threshold, and determine that the first rate of speed change of the first vehicle is an acceleration rate that causes a collision of the first vehicle and the target vehicle, wherein the target vehicle is a leading vehicle in front of the first vehicle, and wherein the second rate of speed change for changing the speed of the first vehicle to the target speed is lower than the first rate of speed change of the first vehicle.

5. The device of claim 4, wherein the at least one instruction, when executed by the processor, is configured to cause the device to:

after the speed changing period, accelerate the first vehicle based on:

an accelerator position sensor signal; and a following vehicle, which follows the first vehicle, associated with a risk of collision with the first vehicle being detected based on a time to collision.

6. The device of claim 1, wherein the at least one instruction, when executed by the processor, is configured to cause the device to:

output an alarm to inform the driver of the first vehicle that the speed control command is limited, and transfer a control right of the first vehicle to the driver based on a second speed control command being detected after outputting the alarm.

7. The device of claim 1, wherein the at least one instruction, when executed by the processor, is configured to cause the device to maintain the target speed by ignoring an additional speed control command detected after the speed changing period.

8. A method for controlling a first vehicle, the method comprising:

detecting, by a device, a speed control command associated with a first rate of speed change of the first vehicle;

determining, based on at least one sensor, whether a target vehicle exists based on detecting the speed control command, wherein the target vehicle is a second vehicle for which a distance to the first vehicle is predicted to decrease based on the speed control command being executed;

based on absence of the target vehicle, controlling a speed of the first vehicle at the first rate of speed change corresponding to the speed control command;

based on presence of the target vehicle, changing, at a second rate of speed change of the first vehicle, the speed of the first vehicle to a target speed during a speed changing period;

controlling autonomous driving of the first vehicle, wherein the speed control command is detected during the autonomous driving of the first vehicle;

after changing the speed of the first vehicle to the target speed, maintaining the target speed; and based on an additional speed control command received while maintaining the target speed, transferring a control authority of the first vehicle to a driver of the first vehicle, wherein the changing the speed of the first vehicle to the target speed is based on a determination that the first vehicle is traveling at a speed that increases the distance between the first vehicle and the target vehicle, and wherein the target speed is determined based on a speed of the target vehicle.

9. The method of claim 8, wherein the detecting of the speed control command comprises:

identifying that a change amount of a brake-pedal position sensor signal of the first vehicle within a unit time is greater than or equal to a first threshold value.

10. The method of claim 9, wherein the changing of the speed of the first vehicle comprises:

reducing the speed of the first vehicle by decelerating the first vehicle, wherein the target vehicle is a following vehicle that follows the first vehicle, and wherein the second rate of speed change of the first vehicle is lower than the first rate of speed change of the first vehicle.

11. The method of claim 10, wherein the determining whether a target vehicle exists comprises:

detecting, based on a time to collision, a leading vehicle, in a position ahead of the first vehicle, associated with a risk of collision with the first vehicle, and wherein the method further comprises, after the speed changing period, decelerating the first vehicle based on:

the brake-pedal position sensor signal; and the detected leading vehicle.

12. The method of claim 8, wherein the detecting of the speed control command comprises:

identifying that a change amount of an accelerator position sensor signal of the first vehicle within a unit time is greater than or equal to a second threshold value.

13. The method of claim 12, wherein the changing of the speed of the first vehicle comprises:

increasing the speed of the first vehicle by accelerating the first vehicle, wherein the target vehicle is a leading vehicle in a position ahead of the first vehicle, and wherein the second rate of speed change of the first vehicle is lower than the first rate of speed change of the first vehicle.

14. The method of claim 13, wherein the determining whether a target vehicle exists comprises:

detecting, based on a time to collision, a following vehicle, which follows the first vehicle, associated with a risk of collision with the first vehicle, and wherein the method further comprises, after the speed changing period, accelerating the first vehicle based on:

the accelerator position sensor signal; and the detected following vehicle.

15. The method of claim 8, wherein the changing of the speed of the first vehicle is performed based on a determination that a time gap between the first vehicle and the target vehicle is greater than or equal to a preset threshold time.

16. The method of claim 8, further comprising:

outputting an alarm to inform the driver of the first vehicle that the speed control command is limited; and transferring a control right of the first vehicle to the driver based on a second speed control command being detected after outputting the alarm.

17. The method of claim 8, further comprising:

maintaining the target speed by ignoring an additional speed control command detected after the speed changing period.

* * * * *